March 27, 1934.  F. E. HAND  1,952,497
TONGUE TRUCK
Filed Jan. 30, 1933   2 Sheets-Sheet 1
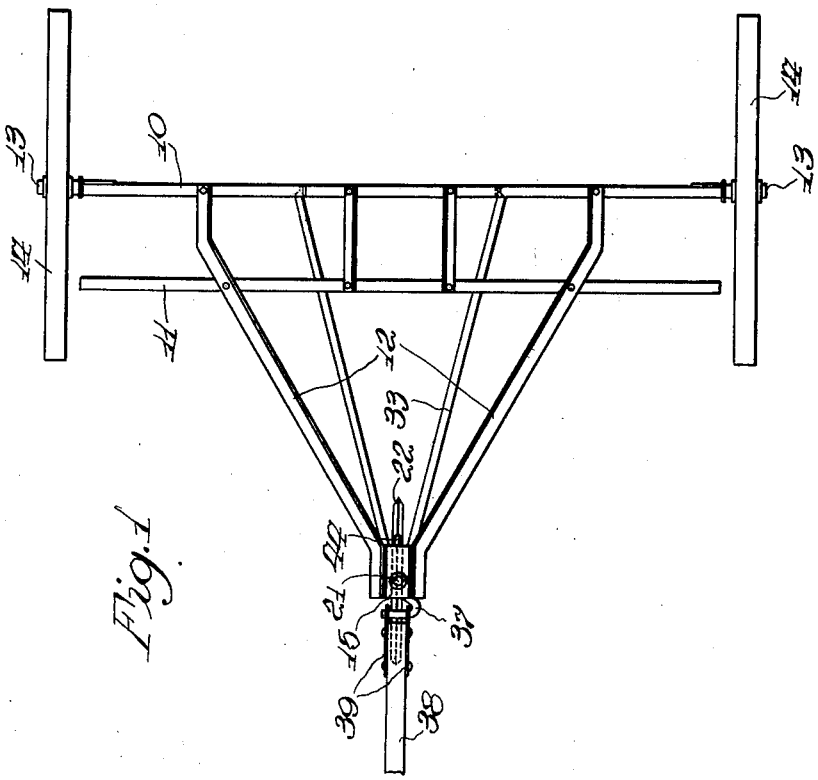
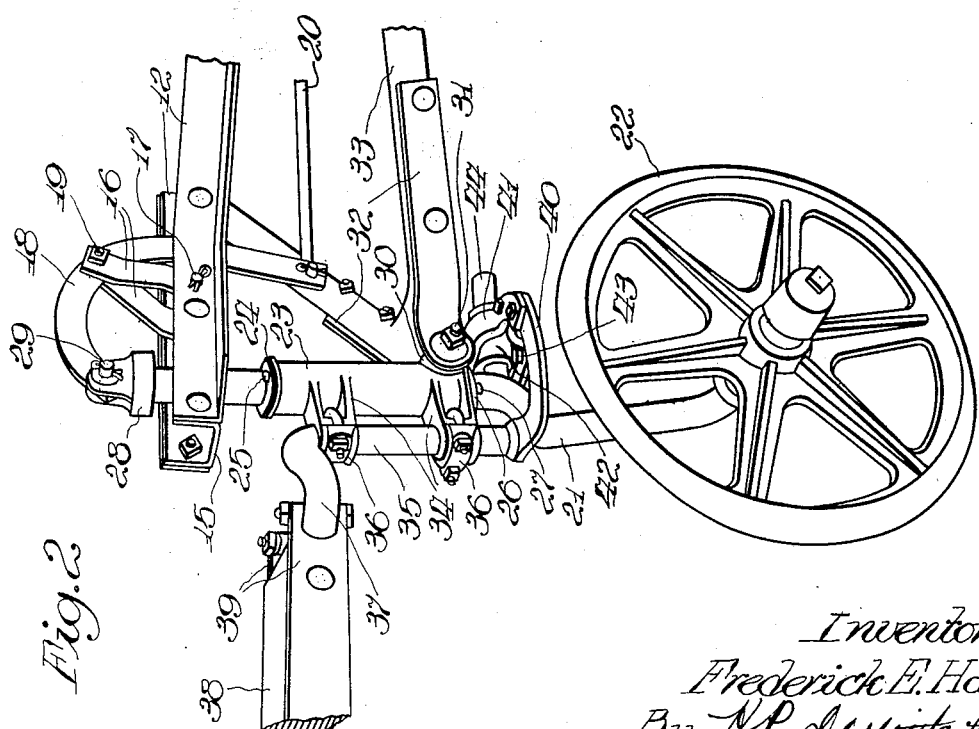
Inventor
Frederick E. Hand
By W. P. Dewitt Atty.

March 27, 1934.  F. E. HAND  1,952,497
TONGUE TRUCK
Filed Jan. 30, 1933   2 Sheets-Sheet 2
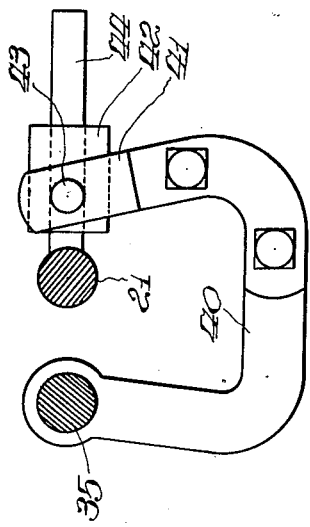
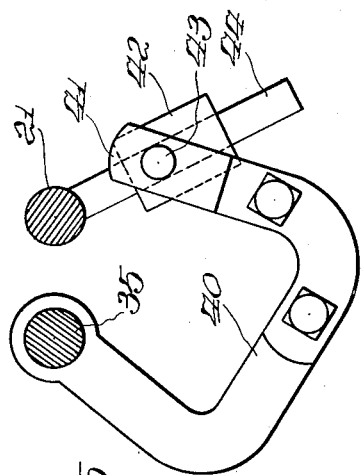
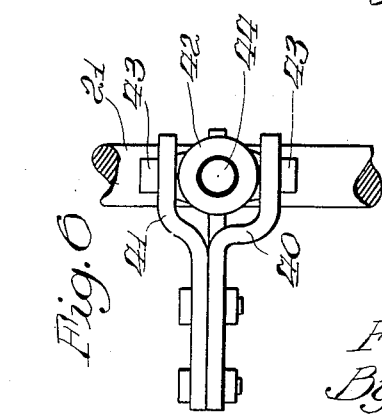
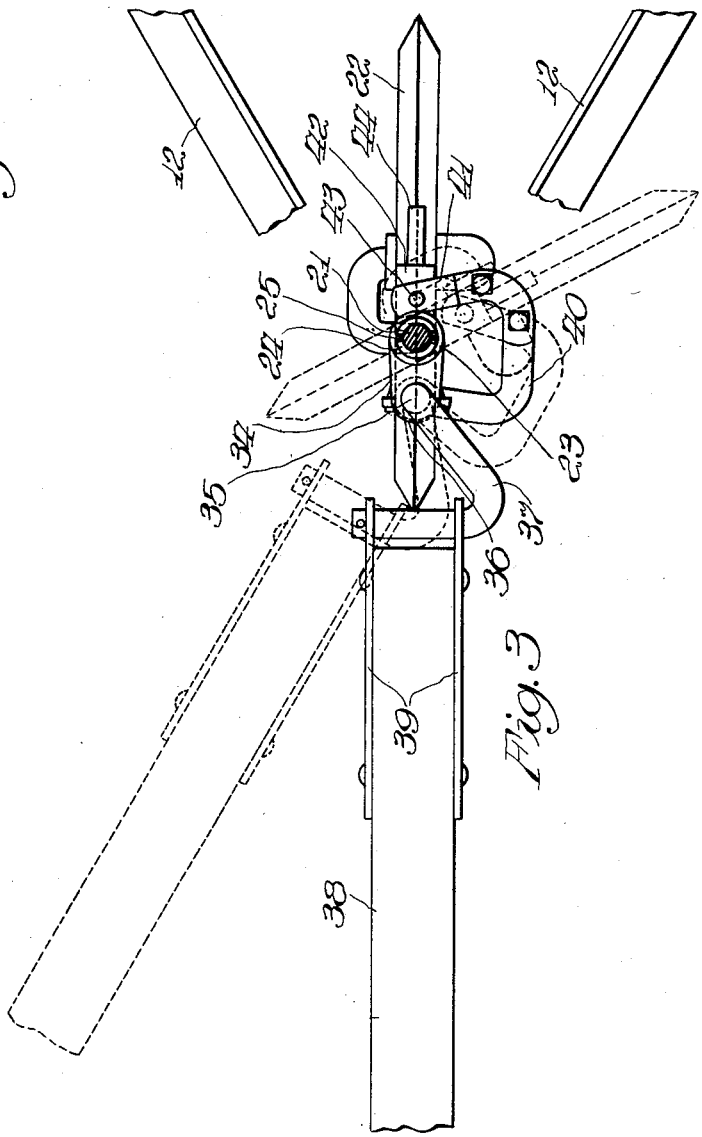
Inventor
Frederick E. Hand Patented Mar. 27, 1934

1,952,497

UNITED STATES PATENT OFFICE 1,952,497

TONGUE TRUCK

Frederick E. Hand, Canton, Ill., assignor to International Harvester Company, a corporation of New Jersey Application January 30, 1933, Serial No. 654,184

8 Claims. (Cl. 280—84)

This invention relates to a tongue truck for implements. More particularly it relates to a positively angled truck, the angular movement of which is relatively different from a tongue which operates the positive angling means.

In row crop cultivation where the rows are ridged or bedded so that the growing crop is in the furrow between the ridges, such as in listed corn, it is necessary for the rear wheel and the tongue truck to run on the tops of the ridges. When the ordinary free castering wheel is used and the cultivator runs off to one side or if the center ridge should be not quite parallel to planted rows there is a tendency for the truck wheel to slide down the slope of the ridge and to skid along the slope instead of quickly climbing back to the top. This unfavorable action is somewhat overcome by using a V-shaped tread on the wheel instead of the common oval faced wheel.

However, it has been found that the only effective control is provided by a tongue guided front wheel and this only when the tongue and wheel are so interconnected that a slight angle of the pole or tongue away from its usual straight forward position causes the wheel to be steered or turned a substantially greater angular distance than the pole. This causes the wheel to cut into and climb the ridge to its correct position.

Steerable wheels of the type above referred to have been provided but in practically all of them there has been so much lost motion due to back lash in geared movements that the device did not respond quickly. Also in this type using a portion of the gear moved by the pole, any mesh with a gear on the wheel standard operates to cause the wheel to be turned through a constantly increased angle for all angular movements of the pole.

The object of the invention is to provide an improved steerable tongue truck operable to turn a relatively large angle for a small angular movement of the tongue during angular movement away from the center position and to reduce the differential as the tongue is moved greater angular distances.

Another object is to provide a positive linkage with a minimum number of parts and connections in order to eliminate lost motion or reduce it to a minimum, thereby providing accurately controlled motion for the truck.

As above stated, the object of the invention is also to provide that the truck wheel is steered through a large angle for small movement of the tongue or steering pole away from a straight ahead position, which angular movement is decreased in proportion as the angularity of the pole is increased.

The objects of the invention are accomplished by a construction as shown in the drawings, in which:

Figure 1 is a plan view of the principal parts of a field implement on which a steerable truck embodying the invention is attached;

Figure 2 is a perspective view of the tongue truck as used on said implement;

Figure 3 is an enlarged plan view of the forward end of the implement frame shown in Figure 1, with portions of the frame broken away in order to show two positions of the truck, one position being shown in dotted lines;

Figure 4 is an enlarged detail of the steering crank in the position in which it would be with the tongue in straight forward position;

Figure 5 is an enlarged detail with the steering tongue in an angle position, for example, as shown in dotted lines in Figure 3; and Figure 6 is an enlarged detail showing the connection of the steering crank with the tongue truck axle or standard.

In Figure 1 a conventional implement frame has been shown. Said frame consists essentially of a rear angle bar 10, a forward angle bar 11, and forwardly extending and converging angle bars 12. Stub axles 13 are rigidly secured to the angle bar 10. Said axles carry wheels 14. The forward ends of the angle bars 12 are connected by a spreader member 15, which is channel shaped, the upturn sides of the channel being bolted to parallel portions of the angle bars 12. Rearwardly from the frame spreader 15 a pair of upwardly and inwardly extending lifting crank supports 16 are pivoted on a pin 17, extending through aligned openings in the parallel portions of the angle bars 12. A curved lifting crank 18 is pivoted intermediate its ends on a bolt 19 extending through the adjacent upper ends of the supports 16. Said lifting crank extends downwardly below the angle bars 12 and a tension rod 20 is connected to the lower end for operating the lifting crank. Said rod extends rearwardly and is adapted to be connected to a conventional lever arrangement for changing the angular position of the lifting crank.

A truck wheel standard 21 carries on its lower end an axle extension on which a ground wheel 22 is mounted. Said wheel has a sharp V-shaped ground engaging surface to facilitate steering, as will be hereinafter described. The axle or standard 21, as it is preferably designated, is bent around the wheel 22 in order to provide a vertical pivot lying in the plane of the wheel. Said standard extends vertically upwardly through a supporting bracket member 23. Said member is generally in the form of a cylindrical sleeve. A bearing washer 24 is mounted above the member around the standard 21 and a caster pin 25 is provided above said washer to limit relative movement of the standard 21 with respect to the member 23. A similar washer 26 and a corresponding key 27 are provided below the member 23 for the same purpose.

Upwardly beyond the member 23 the standard 21 extends through an opening formed in the spreader 15. A cap 28 rigidly secured to the upper end of the standard 21 above the spreader 15, provides means for pivotally attaching the lifting crank 18 by means of a pin 29 extending through aligned openings formed spaced upward extensions of the cap 28.

A boss 30 at the lower end of the member 23 and at the rear of said member is provided with a transverse bore through which a bolt 31 is fitted to pivotally secure to said member a pair of straps 32. Said straps are rigidly secured to the apex of a V-shaped brace 33. The legs of said brace extend upwardly and rearwardly and are pivotally attached to the rear frame member 10 of the implement frame.

On the forward side of the supporting member 23 vertically spaced bosses 34 are provided for rotatably mounting on a vertical axis a steering member 35. However, bearings are formed in the bosses 34 for said member. Bearing caps 36 are secured by U-bolts to the bosses to complete the bearings.

At the upper end of the steering member 35 a crank 37 extending angularly forwardly and then directly transversely for pivotally mounting on a transverse axis a tongue 38. The crank is so shaped that the center of the tongue passes through the vertical pivot axis of the steering member 35. A pair of plates 39 bolted to the tongue, are provided with aligned apertures through which the transverse portion of the crank 37 extends. As the tongue is free to move about a transverse axis, this is known as a drop pole type of hitch.

At its lower end the steering member 35 is provided with a steering crank 40. Said crank extends to one side to the rear and toward the center in somewhat of a goose-neck shape to provide for clearance. The end of said crank is bent downwardly and an additional member 41, similarly bent upwardly, is bolted to the crank to form a pair of spaced ears between which a trunnion member 42 is pivoted on a vertical axis. Said member is provided with trunnions 43 which extend through vertically aligned openings in the parallel spaced portions of the crank 40 and the member 41.

The member 42 is provided with a horizontal bore through which a rearwardly extending stub shaft 44 extends. Said stub shaft is a part of the standard 21. It may be an integral part of said member or may be secured thereto by yielding or by other means.

In the above description the relative positions of the various parts have been described with respect to vertical and horizontal and with respect to the center line of the implement or the line of draft and the transverse position with respect to this line. In the operation of the machine it will be assumed that the tongue 38 is in a straight forward position at right angles to the bars 10 and 11 of the implement frame. When a shift of the implement is desired, the horses or other means of draft are guided to turn the tongue angularly in one direction, for example, to the right, as illustrated in Figure 3. As the tongue is turned, the steering member 35 is rotated about its vertical axis, carrying with it the crank 40. This action will be best understood by inspection of Figures 4 and 5, starting with the steering crank in the position shown in Figure 4, and moving it to the position shown in Figure 5. As the pivot axis of the trunnions 43 move about a radius between said axis and the axis of the steering member 35, the stub shaft 44 is rotated, thereby angling the standard 21 to which it is rigidly secured. As the radius between the pivot axis of the trunnions 43 and the axis of the standard 21 is less than half the radius between the axis of said trunnions and the axis of the steering member 35, it is obvious that the truck standard will be moved an appreciably larger angle. However, during this operation the trunnion member 42 also moves outwardly along the stub shaft 44, thereby increasing the radius of application of torque to the standard 21 and decreasing the relative difference in the radial distances from the trunnion pivot axes to the axes of the standard 21 and the steering member 35.

The actual angular movements of the standard 21 and the steering member 35 for a construction substantially the same in proportions as that shown in the drawings, have been measured. During the first 5 degrees movement of the tongue the caster wheel was rotated 13 degrees. During the next 5 degrees of rotation the caster wheel was rotated 12 degrees, giving a total of 25 degrees for the first 10 degrees of rotation of the tongue.

During the third increment of rotation the steering truck was rotated 11 degrees for 5 degrees of rotation of the tongue. In the fourth increment the truck was rotated 10 degrees for 5 degrees of rotation. In the next increment the truck was rotated 9 degrees for 5 degrees rotation of the tongue. Adding these angular movements the tongue truck was rotated 55 degrees for 25 degrees rotation of the tongue or steering pole. In actual practice it is only necessary to turn the tongue 25 degrees for turning the machine around at the end of the rows in the field, with one rear wheel acting as a pivot. For that reason there is no object in considering what happens during larger angular movements of the tongue. Of course, provision is made for maximum angular movement of the tongue under any condition.

In lifting or lowering the implement frame relative to the tongue truck, the rod 20 is actuated, that is, moved in a longitudinal direction. By this movement the standard 21 is moved vertically relative to the spreader 15 through which it passes. It will be noted that the steering mechanism is entirely independent of the lifting and lowering of the frame whereby the operation of one of the mechanisms in no way interferes with the operation of the other. This is a particularly desirable feature.

By a construction as above described, a slight angular movement of the tongue in either direction causes a relatively larger angular movement of the truck. With a single wheel as illustrated, this action is particularly desirable for regaining the position of the truck wheel on the top of ridges such as are used, for example, in sections of the country where corn is listed. It is also desirable for general use to have a tongue truck which responds rapidly to steering movement whereby the implement is quickly adjusted laterally to the desired position without giving the tongue a large angular movement which would necessitate guiding the horses or other draft means out of the normally required position.

It is to be understood that applicant has shown and described only a preferred embodiment of his improved steerable truck and that he claims as his invention all modifications falling within the scope of the appended claims.

What is claimed is:

1. In a field implement having a frame structure and in combination therewith a tongue truck having a standard pivotally mounted on said structure on a substantially vertical axis, a steering means pivotally mounted on the frame structure on a substantially vertical axis spaced forwardly from the axis of the truck standard, a steering crank connected to the steering means and extending around and behind the steering standard in clearance relation with respect thereto, a rearwardly extending stub shaft rigidly connected to the tongue truck, and means for pivotally and slidable connecting said stub shaft to the steering crank.

2. In a field implement having a frame structure and in combination therewith a tongue truck having a standard pivotally mounted on said structure on a substantially vertical axis, a steering means pivotally mounted on the frame structur on a substantially vertical axis spaced forwardly from the axis of the truck standard, a steering crank connected to the steering means and extending rearwardly around and behind the tongue truck standard, a rearwardly extending stub shaft rigidly connected to the tongue truck, a slidable member mounted on said shaft and means for pivotally connecting the steering crank to said member on a substantially vertical axis.

3. In a field implement having a frame and in combination therewith a tongue truck supporting structure secured to the frame, a tongue truck pivotally mounted beneath said structure on a substantially vertical axis, a steering means pivoted on said support on a substantially vertical axis spaced from the axis of the truck, a tongue connected to said steering means, a steering crank connected to said steering means, a steering element connected to the truck and extending horizontally therefrom, and means for pivotally and slidably connecting said steering element and the steering crank.

4. In a field implement having a frame and in combination therewith a tongue truck supporting structure secured to the frame, a tongue truck pivotally mounted beneath said structure on a substantially vertical axis, a steering means pivoted on said support on a substantially vertical axis spaced from the axis of the truck, a tongue connected to said steering means, a steering crank connected to said steering means, a steering element connected to the truck and extending horizontally therefrom, a member slidably mounted on said element, and means for pivotally connecting the steering crank to said member on a substantially vertical axis.

5. In a field implement having a frame and in combination therewith a tongue truck supporting structure secured to the frame, a tongue truck pivotally mounted beneath said structure on a substantially vertical axis, a steering means pivoted on said support on a substantially vertical axis spaced forwardly from the axis of the truck, a tongue connected to said steering means, a steering crank connected to said steering means and extending horizontally and rearwardly therefrom in clearance relation with respect to the tongue truck axis, a steering element connected to the truck and extending horizontally and rearwardly therefrom, a member slidably mounted on said element, and means for pivotally connecting the steering crank to said member on a substantially vertical axis.

6. In a field implement having a wheel supported main frame and in combination therewith, a vertically extending truck standard, a ground wheel mounted on said standard, means for adjustably supporting the frame with respect to said standard, a supporting member for the standard below said frame, bracing means extending from said supporting member to the frame, a steering member pivoted on the supporting member on a vertical axis, a draft tongue secured to the steering member for angular rotation thereof, a stub shaft extending rearwardly from the truck standard, a steering crank secured to the steering member, and a member slidably mounted on said stub shaft, said steering crank being pivotally connected to said member whereby angular movement of the steering member is imparted to the truck standard.

7. In a field implement having a wheel supported main frame and in combination therewith a vertically extending truck standard, a ground wheel mounted on said standard, means for adjustably supporting the frame at the upper end of said standard, a supporting member for the standard below said frame, bracing means extending from said supporting member to the frame, a steering member pivoted on the supporting member on a vertical axis, a draft tongue secured to the steering member for angular rotation thereof, a stub shaft extending rearwardly from the truck standard, a steering crank secured to the steering member and extending rearwardly therefrom in clearance relationship with respect to the truck standard, a member slidably mounted on said stub shaft, said steering crank being pivotally connected to said member whereby angular movement of the steering member is imparted to the truck standard.

8. In a field implement having a wheel supported main frame and in combination therewith a vertically extending truck standard, a ground wheel mounted on said standard, means for adjustably supporting the frame at the upper end of said standard, a supporting member for the standard below said frame, bracing means extending from said supporting member to the frame, a steering member pivoted on the supporting member on a vertical axis, a draft tongue secured to the steering member for angular rotation thereof, a stub shaft extending rearwardly from the truck standard, a steering crank secured to the steering member, and means for slidably and pivotally connecting said crank to the stub shaft whereby angular movement of the steering member is imparted to the truck standard.

FREDERICK E. HAND.